United States Patent
Song et al.

(10) Patent No.: US 9,514,160 B2
(45) Date of Patent: Dec. 6, 2016

(54) AUTOMATIC RECOVERY OF A FAILED STANDBY DATABASE IN A CLUSTER

(71) Applicant: Oracle International Corporation, Redwood Shores, CA (US)

(72) Inventors: Shanshan Song, Fremont, CA (US); Yunrui Li, Fremont, CA (US); Tolga Yurek, Foster City, CA (US); Mahesh Girkar, Cupertino, CA (US); Neil MacNaughton, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 248 days.

(21) Appl. No.: 13/794,112

(22) Filed: Mar. 11, 2013

(65) Prior Publication Data
US 2014/0258224 A1     Sep. 11, 2014

(51) Int. Cl.
*G06F 17/30*     (2006.01)

(52) U.S. Cl.
CPC ... *G06F 17/30289* (2013.01); *G06F 17/30575* (2013.01); *G06F 17/30581* (2013.01)

(58) Field of Classification Search
CPC .................... G06F 17/30575; G06F 17/30351; G06F 17/30581
USPC ........................................ 707/704, 781, 610
See application file for complete search history.

(56) References Cited

U.S. PATENT DOCUMENTS

| | | | |
|---|---|---|---|
| 5,485,608 A * | 1/1996 | Lomet et al. | |
| 6,490,722 B1 | 12/2002 | Barton et al. | |
| 6,532,494 B1 | 3/2003 | Frank et al. | |
| 6,618,822 B1 | 9/2003 | Loaiza et al. | |
| 6,871,222 B1 | 3/2005 | Frank et al. | |
| 6,963,957 B1 | 11/2005 | Kundu et al. | |
| 7,020,695 B1 | 3/2006 | Kundu et al. | |
| 7,076,783 B1 | 7/2006 | Frank et al. | |
| 7,082,435 B1 | 7/2006 | Guzman et al. | |
| 7,222,136 B1 | 5/2007 | Brown et al. | |
| 7,236,993 B2 | 6/2007 | Brown et al. | |

(Continued)

OTHER PUBLICATIONS

Oracle Database Upgrade Guide 10g Release 2 (10.2) B14238, Jan. 2008.

(Continued)

*Primary Examiner* — Monica Pyo
(74) *Attorney, Agent, or Firm* — Vista IP Law Group, LLP; Peter C. Mei

(57) ABSTRACT

A method, system, and computer program product. The method for non-intrusive redeployment of a standby database facility comprises configuring a database system having a shared lock manager process to synchronize two or more concurrent access instances, then granting lock requests for access to a cache of database blocks. At some moment in time, the shared lock manager process may fail, and a monitor process detects the failure or other stoppage of the shared lock manager process. A new shared lock manager process and other processes are started, at least one of which serves for identifying the database blocks in the cache that have not yet been written to the database. The identified blocks are formed into a recovery set of redo operations. During this time, incoming requests for access to the cache of database blocks are briefly blocked, at least until the recovery set of redo operations has been formed.

20 Claims, 10 Drawing Sheets

(56) References Cited

U.S. PATENT DOCUMENTS

| | | |
|---|---|---|
| 7,310,653 B2 | 12/2007 | Coyle et al. |
| 7,363,538 B1 | 4/2008 | Kundu et al. |
| 7,406,486 B1 | 7/2008 | Kundu et al. |
| 7,464,113 B1 | 12/2008 | Girkar et al. |
| 7,617,175 B1 | 11/2009 | Mouton et al. |
| 7,617,254 B2 | 11/2009 | Loaiza et al. |
| 7,664,795 B2 | 2/2010 | Balin et al. |
| 7,840,603 B2 | 11/2010 | Huang et al. |
| 7,890,466 B2 | 2/2011 | Kundu et al. |
| 7,996,363 B2 | 8/2011 | Girkar et al. |
| 8,086,564 B2 | 12/2011 | Kundu et al. |
| 8,117,153 B2 * | 2/2012 | Cattell et al. ............... 707/610 |
| 8,676,752 B2 | 3/2014 | Kundu et al. |
| 2002/0165944 A1 | 11/2002 | Wisner et al. |
| 2004/0030954 A1 | 2/2004 | Loaiza et al. |
| 2004/0210577 A1 | 10/2004 | Kundu et al. |
| 2005/0262170 A1 | 11/2005 | Girkar et al. |
| 2006/0004838 A1 | 1/2006 | Shodhan et al. |
| 2006/0015542 A1 * | 1/2006 | Pommerenk et al. ........ 707/202 |
| 2007/0192290 A1 | 8/2007 | Zaytsev et al. |
| 2007/0192384 A1 | 8/2007 | Shodhan et al. |
| 2008/0162590 A1 | 7/2008 | Kundu et al. |
| 2008/0301489 A1 | 12/2008 | Li et al. |
| 2009/0157764 A1 | 6/2009 | Kundu et al. |
| 2011/0106778 A1 * | 5/2011 | Chan et al. ............... 707/704 |
| 2012/0041926 A1 | 2/2012 | Kundu et al. |
| 2012/0054533 A1 * | 3/2012 | Shi et al. ............... 714/4.1 |
| 2012/0059792 A1 | 3/2012 | Kundu et al. |
| 2014/0068584 A1 | 3/2014 | Lim et al. |

OTHER PUBLICATIONS

Non-final Office Action dated Feb. 27, 2014, for U.S. Appl. No. 13/600,786.
Final Office Action dated Aug. 5, 2014 for U.S. Appl. No. 13/600,786.
Non-final Office Action dated Dec. 4, 2014 for U.S. Appl. No. 13/600,786.
Non-final Office Action dated Aug. 13, 2015 for related U.S. Appl. No. 13/600,786.
Oracle, Database Rolling Upgrade Using Transient Logical Standby Oracle Database 10g Release 2, Aug. 2010.
Final Office Action dated May 5, 2015 for U.S. Appl. No. 13/600,786.
Final Office Action dated Jan. 13, 2016 for related U.S. Appl. No. 13/600,786.
Advisory Action dated Apr. 22, 2016 for related U.S. Appl. No. 13/600,786.
Notice of Allowance and Fee(s) due dated Aug. 3, 2016 for related U.S. Appl. No. 13/600,786.
Wolski et al., "Rolling Upgrades for Continuous Services", First International Service Availability Symposium, ISAS 2004, Munich, German, May 13-14, 2004, pp. 175-189.

* cited by examiner

AUTOMATIC RECOVERY OF A FAILED STANDBY DATABASE IN A CLUSTER

RELATED APPLICATIONS

Certain aspects in some embodiments of the present application are related to material disclosed in U.S. patent application Ser. No. 13/600,786, entitled "DATABASE SOFTWARE UPGRADE USING SPECIFY-VALIDATE-EXECUTE PROTOCOL" filed on Aug. 31, 2012, the content of which is incorporated by reference in its entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of high-availability/high-performance clustered database systems and more particularly to techniques for non-intrusive redeployment of a standby database facility in a cluster environment.

BACKGROUND

Modern database systems are often configured for high-performance and high-availability. In some installations, multiple computing nodes (e.g., in a clustered environment) are used to deliver high-performance read/write application access by deploying respective different applications (e.g., accounts payable, accounts receivable, etc.) in a multi-instance configuration where each computing node runs one or more concurrent instances. Often, high-availability is fostered by the deployment of a standby database that serves applications such as report generation. One or more instances of a standby database is provisioned on a computing node different from the computing nodes used by the aforementioned read/write applications.

Database systems that support multiple concurrent applications strive to manage concurrent access by using semaphores or other forms of locks, and often the semaphores or locks are managed by a single "master" lock manager process running on one of the computing nodes.

If the computing node on which the lock manager process is running fails, or if the lock manager process itself fails, then the locking mechanism to prevent conflicting writes to the database fails to perform as intended, and the database becomes at risk of being corrupted unless remedial steps are taken. Legacy remedial steps have included an immediate and forced shutdown of any instances that own a lock. While such sorts of remedial steps often serve to prevent corruption of the database, less intrusive techniques for recovering after a failure are needed.

In some deployments, the lock manager process is configured to run on the same computing node as the standby database, thus in the event of a failure of the computing node running the standby database, both the lock manager and the standby instance need to be redeployed in order to return the cluster to its pre-defined high-availability configuration. Again, legacy remedial steps to return the cluster to its high-performance and high-availability configuration have included manual re-provisioning of the standby node. While such sorts of remedial steps often serve to return the cluster to its pre-defined high-availability configuration, more graceful techniques for recovering after a failed standby node are needed.

SUMMARY

The present disclosure provides an improved method, system, and computer program product suited to address the aforementioned issues with legacy approaches. More specifically, the present disclosure provides a detailed description of techniques used in methods, systems, and computer program products for non-intrusive redeployment of a standby database facility in a cluster environment.

The method for non-intrusive redeployment of a standby database facility comprises configuring a database system having a shared lock manager process to synchronize two or more concurrent access instances, then granting lock requests for access to a cache of database blocks. At some moment in time, the shared lock manager process may fail, and a monitor process detects the failure or other stoppage of the shared lock manager process. A new shared lock manager process and other processes are started, at least one of which serves for identifying the database blocks in the cache that have not yet been written to the database. The identified blocks are formed into a recovery set of redo operations. During this time, incoming requests for locks to access to the cache of database blocks are briefly blocked, just until the recovery set of redo operations has been formed. In another regime, incoming requests for access to the cache of database blocks are blocked until after the recovery set of redo operations has been formed and the recovery set of redo operations has been safely written to the database.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
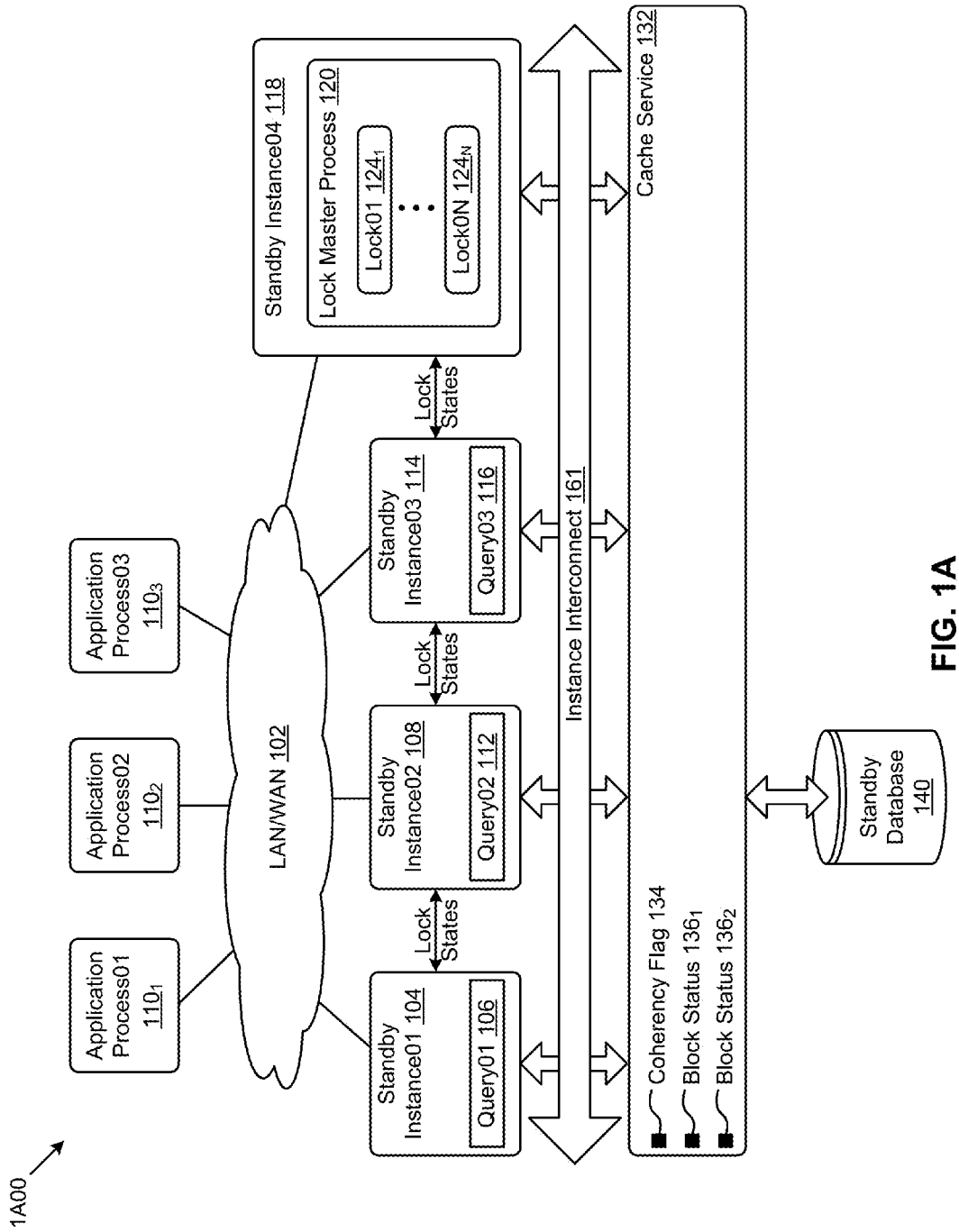
FIG. 1A shows an initial state of a high-availability system using non-intrusive redeployment of a standby database facility in a cluster environment, according to some embodiments.

Some embodiments of the present disclosure address the problems of providing redeployment of a failed standby database facility, and some embodiments are directed to an improved approach for implementing non-intrusive redeployment of a standby database facility in a cluster environment. More particularly, disclosed herein and in the accompanying figures are exemplary environments, methods, and systems for implementing non-intrusive redeployment of a standby database facility in a cluster environment.

Overview

To manage concurrent access by multiple computing nodes to a database, semaphores or other forms of locks are used, and often the semaphores or locks are managed by a master lock manager process running on one of the computing nodes. If the computing node on which the lock manager process is running fails, or if the lock manager process itself fails, then the locking mechanism to prevent conflicting writes to the database may also fail and the database becomes at risk of being corrupted. Legacy remedial steps taken upon detection of such failures have included an immediate and forced shutdown of any instances that own a lock. While application of such a remedial step can often serve a limited purpose to prevent corruption of the database, less intrusive techniques for recovering after a failure are needed, some of which techniques are disclosed herein.

The aforementioned multiple computing nodes sometimes include a standby database controlled by one or more standby instances (see FIG. 1A, infra) A standby database is often implemented as a physical copy of a primary database that is opened for read-only access by an application while it continuously applies changes transmitted from the primary database to the standby instance. Sometimes the changes are codified in the form of a series of redo operations, and/or in the form of a redo log.

In certain situations, a standby database is configured to serve real-time, read-only queries (e.g., for generating reports), which services have the desired effect of offloading read-only workloads to the standby database, which read-only workloads would otherwise be run on the primary database. Such a standby database facility enables customers to run queries and reports against an up-to-date physical standby database while enhancing the likelihood and speed of recovery in the event that a failover is required. Yet, the mere existence of another computing component increases commensurately the likelihood of a failure in the overall system, and improved techniques for recovering after a failure are needed.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A shows an initial state of a high-availability system 1A00 using non-intrusive redeployment of a standby database facility in a cluster environment. As an option, the present high-availability system 1A00 may be implemented in the context of the architecture and functionality of the embodiments described herein. Also, the high-availability system 1A00 or any aspect therein may be implemented in any desired environment.

As shown, a copy of a production database (e.g., standby database 140) is accessed concurrently by multiple applications (e.g., application process01 $110_1$, application process02 $110_2$, application process03 $110_3$, etc.) which applications in turn use database access instances (e.g., standby instance01 104, standby instance02 108, standby instance03 114, etc.) through which instances is provided various forms of read-only access to the standby database 140, and the applications can run with alacrity in parallel. For example an installation might handle an 'accounts payable reports' application using a first instance, and an 'inventory reporting' application in a second instance.

In an exemplary deployment of a standby database, one or more standby database access instances (e.g., standby instance01 104, standby instance02 108, standby instance03 114, and standby instance04 118) continuously apply changes transmitted from the primary database. Thus, applications (e.g., report generators) are able to query data from the standby database even as data changes are being applied—while still providing read consistency. Following one technique for providing read consistency, a standby database system (e.g., standby instance04 118) can provide a read-consistent view of the data by observing the timing (e.g., timing/sequencing) of changes made to the primary database, and applying those changes in a timing-wise consistent manner. For example, a query timestamp can serve for calculating the status of applying standby redo log data changes (and its corresponding dependent redo log data changes) in relation to the time-wise status of changes made to the primary database.

Clustering, Locks and Cache

Returning to the discussion of database access instances, each database instance in a cluster is configured such that each database instance uses its own respective memory structures and its own respective background processes. In some cases, and as is shown in FIG. 1A, the cluster uses a global cache service (e.g., cache service 132) to provide cache access and write synchronization of the data stored in the standby databases (as shown). When a data block located in the cache belongs to one instance (e.g., is locked by an instance) is required by another instance, the cache service transfers the data blocks directly between the instances using an inter-instance interconnect (e.g., instance interconnect 161), enabling coordination between the clustered database instances to access and modify data destined for the standby database.

As shown, the cache service includes a block-by-block status indication (e.g., block status $136_1$, block status $136_2$, etc.). Such an indication can be used to determine if there are any "dirty" blocks in the cache, and can be used to determine the owner of a lock corresponding to a particular block. An amalgamation of all block-by-block status indications can further be used to determine coherency of the cache (e.g., see coherency flag 134).

Continuing with the discussion of locks, a distributed lock manager (e.g., a lock master process 120) serves to coordinate concurrent access to data blocks across multiple instances using semaphores or other forms of locks (e.g., lock01 $124_1$, lock0N $124_N$, etc.). In exemplary embodiments, a lock master process has several lock modes:
  1. A "multi-master mode", where multiple lockmasters are distributed among several instances;
  2. A "single master mode", where one instance is the lock master of all data blocks, and
  3. An "instance recovery mode" where locks are managed with respect to the status of various operations involved in recovery of a standby database.

When a standby database system is not actively applying redo logs (e.g., is not in sync with its primary database but is yet available for query access), the lock master process initializes itself to run under multi-master mode. However, when a standby database system is actively applying redo logs (e.g., is in sync with its primary database and open for query access), the lock master process initializes itself to run under single master mode. Further, to achieve improved system-wide performance, the lock master process runs on the same computing node as the standby database system instance. For example, the lock master process might run on the instance that runs standby media recovery and might serve to apply redo logs sent from its primary database. In such a configuration, the standby database system instance assumes the role of lock master of all data file blocks. It is possible that the computing node hosting the standby database system instance can fail, and it is possible that a lock master process can fail. In either of those failure scenarios, the entire state of the locks is lost, and coordination of multiple concurrent database access instances is no longer possible until at least some remedial steps are taken.

Remedial Steps After Failure of the Standby Node or Processes Thereon

In some environments, high-availability is enhanced by provisioning of a media recovery facility. Such a facility would participate in the locking mechanism as discussed in the foregoing. The media recovery facility and its relationship to a lock master process is further discussed below.

As earlier indicated, on a clustered standby database, if the standby database system instance crashes, the remaining open instances might be forced to kill their respective user sessions (e.g., application process01 $110_1$, application process02 $110_2$, application process03 $110_3$, etc.) as well as their respective network connections (e.g., over LAN/WAN 102), and the application processes transition into a closed state, which might then need to be restarted. In some cases, when the standby database system instance fails (and/or when the lock master process fails), the state of the lock master process is lost so the states of the locks are lost, and the status of blocks in the cache service could be lost as well. As a result, queries (e.g., query01 106, query02 112, query03 116, etc.) cannot proceed because they cannot obtain the necessary locks to access data blocks in a safe fashion (e.g., safe with respect to other instances that might access the same data blocks). While the foregoing describes one possible set of remedial steps taken after failure of the standby node or failure of the lock master process thereon, the disclosures herein provide improvements.

Figure 1B:
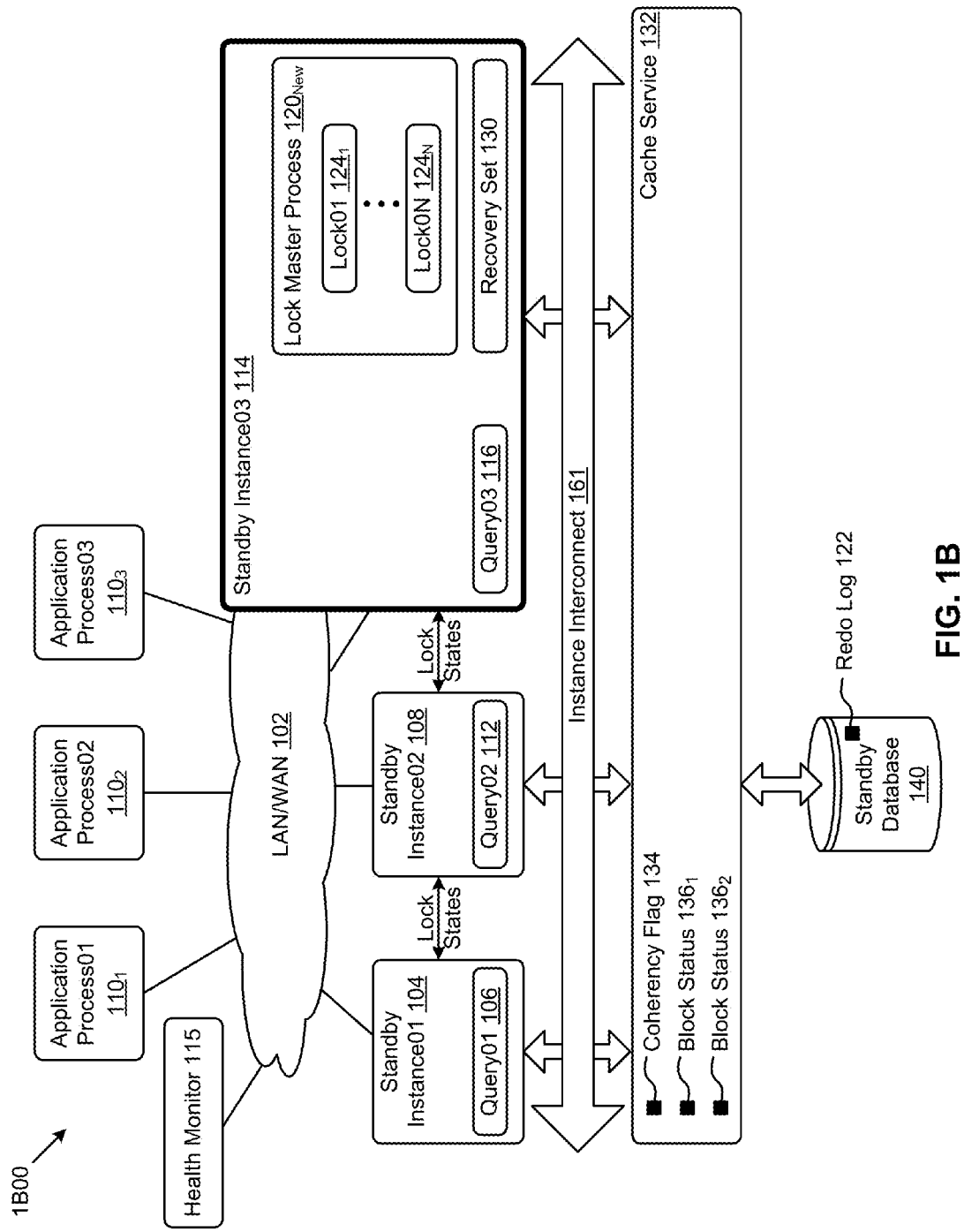
FIG. 1B shows a recovery state of a high-availability system using non-intrusive redeployment of a standby database facility in a cluster environment, according to some embodiments.

FIG. 1B shows a recovery state of a high-availability system 1B00 using non-intrusive redeployment of a standby database facility in a cluster environment. As an option, the present high-availability system 1B00 may be implemented in the context of the architecture and functionality of the embodiments described herein. Also, the high-availability system 1B00 or any aspect therein may be implemented in any desired environment.

The recovery state as shown in FIG. 1B depicts instance recovery in accordance with the disclosures herein. This type of recovery relies in part on detecting certain failures (e.g., detecting a failure of the shared lock manager process). To facilitate such detection, processes within a cluster provide a "heartbeat", and heartbeat monitor (e.g., health monitor 115) runs within the cluster, and can notify any one or more processes of a health situation and/or failure of a node or process.

The herein-disclosed instance recovery mode is entered automatically upon detecting the failure of the standby database system instance or one of its components. Instance recovery is able to:
  initiate and confirm coherency of the cache,
  recover the standby database to a consistent state using a newly-deployed standby system instance in conjunction with the redo log (e.g., all or a portion of the recovery set),
  mark all data files (e.g., all data blocks in the database system) as open for query, and
  confirm or clean-up the validity of the lock master process, to indicate that new lock activity can resume on all data blocks. During the lock cleanup, those locks that were granted by the former (now failed) master are not necessarily revoked, instead, they can be replayed to the new lock master.

Rather than kill application processes and restart them, the remaining open instances and their respective application processes are kept alive and in a state that is incipient to process further queries. For example, respective application process might have ownership of a lock, and the status of the lock can be imputed. Or, as earlier indicated, during the lock master reconfiguration, those locks that were granted by the former (now failed) lock master are not revoked, instead, lock states are replayed to the new lock master.

After detecting a node failure or node stoppage, the services of the failed node are assigned to one of the remaining one or more concurrent access instances to become a new standby database instance, and to run a new shared lock manager process. As shown, standby instance03 becomes the replacement standby instance, and a new lock master process $120_{New}$ is invoked.

To facilitate the steps as outlined above, a new lock master process lock mode is defined in order to facilitate standby instance recovery (see the discussion of FIG. 2, below). As can now be understood, the processes that were not killed (see above) might attempt to continue to interact with the standby databases. However, at this juncture the standby database has not yet been fully re-established. Even though there is a database slated to become the recovered standby database, and even though there is a re-initialized redo log 122, it takes some time to identify the recovery set 130, and still more time to complete the rebuild to generate the recovered standby database once the recovery set has been identified. Accordingly, the techniques below facilitate:
  a blocking period until the rebuild of the recovered standby database is deemed completed, or alternatively;
  a blocking period just until the recovery set has been identified.

In the latter case of enforcing a blocking period just until the recovery set has been identified, the application processes can continue to operate while the rebuild of the recovered standby database is being performed.

Techniques: Blocking Through Rebuild Completion and Blocking Through Recovery Set Identification Blocking Through Rebuild Completion: In this regime, queries from instances are blocked during a period through completion of the instance recovery procedure (e.g., through the rebuilding of the standby database). In this approach, queries would be placed into a wait state (e.g., would be blocked) when trying to obtain any lock master process lock.

Blocking Through Recovery Set Identification: In this regime, queries are blocked only during the period until such time as the recovery set has been identified—which period is often much shorter than the period through completion of the instance recovery procedure.

The recovery set identification can commence in the same timeframe as the invocation of the new lock master process $120_{New}$. By scanning of the redo log, the recovery set can be identified. Once the recovery set is identified, the lock master process lock domain is marked as valid and the lock mode can operate in a single master mode. In this regime, queries are allowed to proceed from this point. The lock master process reconfiguration and redo log scanning are not time consuming operations; therefore, compared with the approach of blocking through rebuild completion, the approach for blocking only through the period of recovery set identification further reduces the blocking time.

Other Failure Scenarios

The new instance recovery technique works regardless of whether the failed standby database system was performed by a single instance or by multiple instances. In the case that the failed standby database system runs on multiple instances, and one of the recovery instances crashes, then recovery sessions of all instances would stop. A new lock master process will reconfigure to run in instance recovery mode (see FIG. 2).

In some situations, a standby database system or components thereto are purposely taken offline. In such a case the standby database system does not 'fail', but nevertheless the health monitor detects the stoppage of the standby database system or components that are purposely being taken offline, and an instance recovery mode 212 is entered automatically.

In some situations, the instance recovery procedure itself may encounter errors and may not be able to recover a standby database to a consistent state. For example, an instance recovery procedure may not be able to obtain all required redo log entries due to a disconnected network between primary and standby. If this happens, it is possible to revert to the legacy behavior of forcefully killing all sessions and closing database connections in all instances.

If any instance of a recovery process (or the instance itself) crashes abnormally, then a lock master process will remain 'stuck' in the instance recovery mode. In this case, another open instance will be prompted to run an instance recovery procedure again. The same procedure repeats until the instance recovery procedure succeeds, or there is no open instance to run an instance recovery procedure.

Figure 2:
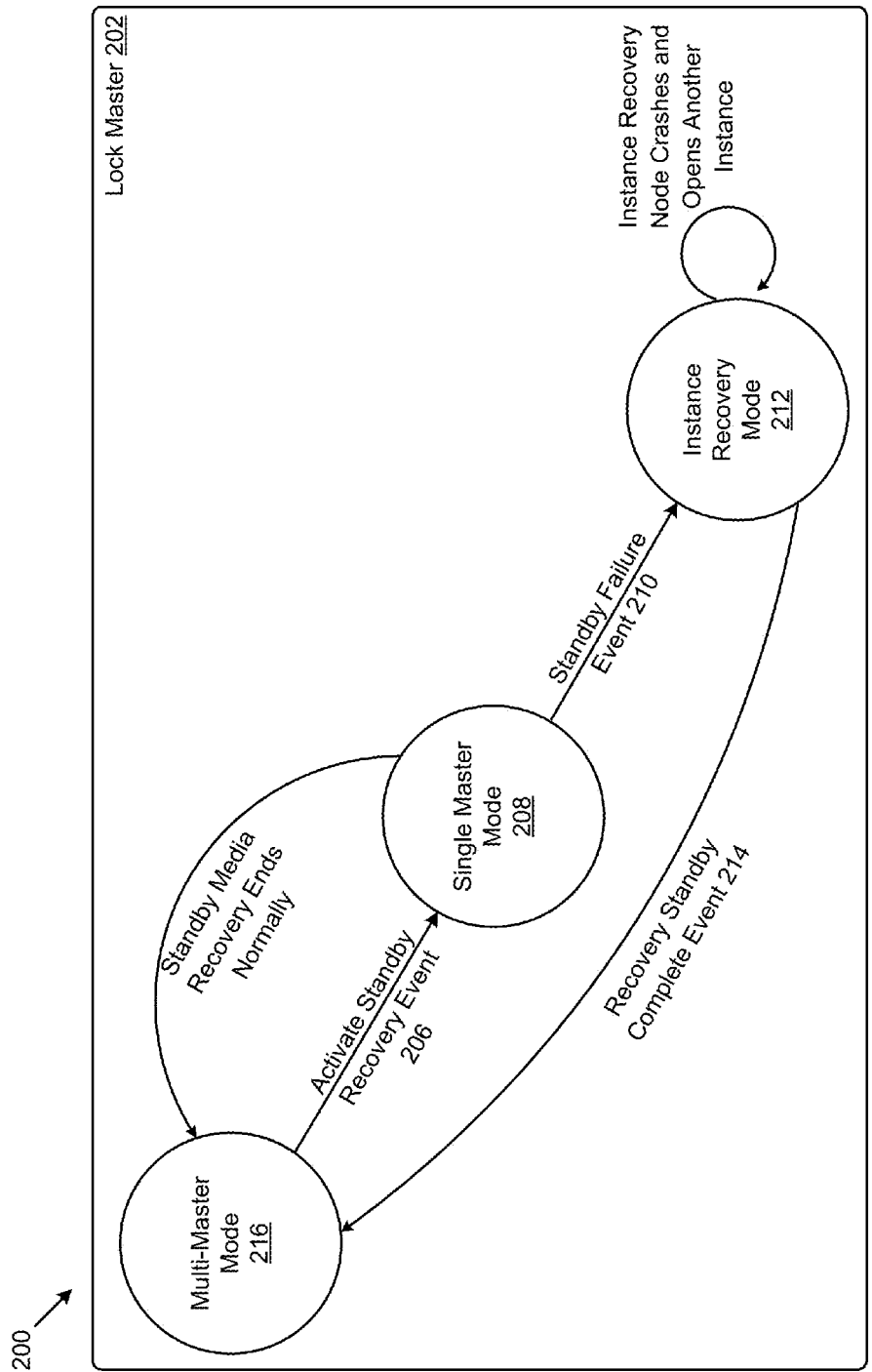
FIG. 2 depicts state transitions within a lock master process as used for non-intrusive redeployment of a standby database facility in a cluster environment, according to some embodiments.

FIG. 2 depicts state transitions 200 within a lock master process as used for non-intrusive redeployment of a standby database facility in a cluster environment. As an option, the present state transitions 200 may be implemented in the context of the architecture and functionality of the embodiments described herein. Also, the state transitions 200 or any aspect therein may be implemented in any desired environment.

As shown, if the system within which the lock master is invoked is configured to have an active standby database, then some event (e.g., an activate standby recovery event 206) causes transition to a single master mode 208. In this case, standby media recovery is running or would be invoked and begin running. Alternatively, a multi-master mode 216 is entered, in which case there is no standby media recovery process running. In the case of operation in a single master mode 208, it can happen that a standby database failure of some sort is detected (e.g., by the lock master, or by another mechanism) and the lock master will process the standby failure event 210, including moving to the instance recovery mode 212 as discussed supra. A standby failure event can be triggered as a result of a crash of a standby media instance (e.g., a hardware or connectivity failure), or as a result of a crash of a standby media process (e.g., a process fault or operating system fault). The processing of the lock master when entering instance recovery mode depends on the type of failure. Strictly as one example, instance recovery mode 212 can be entered after detecting a standby failure that (for example) is of the nature of a communication-type failure, while the processor of the host node continues operating normally. Or, as another example, the lock manager might not be running on the failed node at all.

As shown in FIG. 2, lock master 202 can exit the instance recovery mode 212 after completion of the recovery (see event 214). The specific techniques for movement between lock master states often depend on the semantics and precise definitions of the terms 'failure' and 'recovery'. Regardless, as can be seen, a lock master running on a system with standby activated can reach the single master mode 208 either at the conclusion of a recovery (e.g., in the case of transition from instance recovery mode 212), or upon entry at invocation.

The processing flow and decisions taken by the health monitor and lock master while in the instance recovery mode are briefly discussed below.

Figure 3:
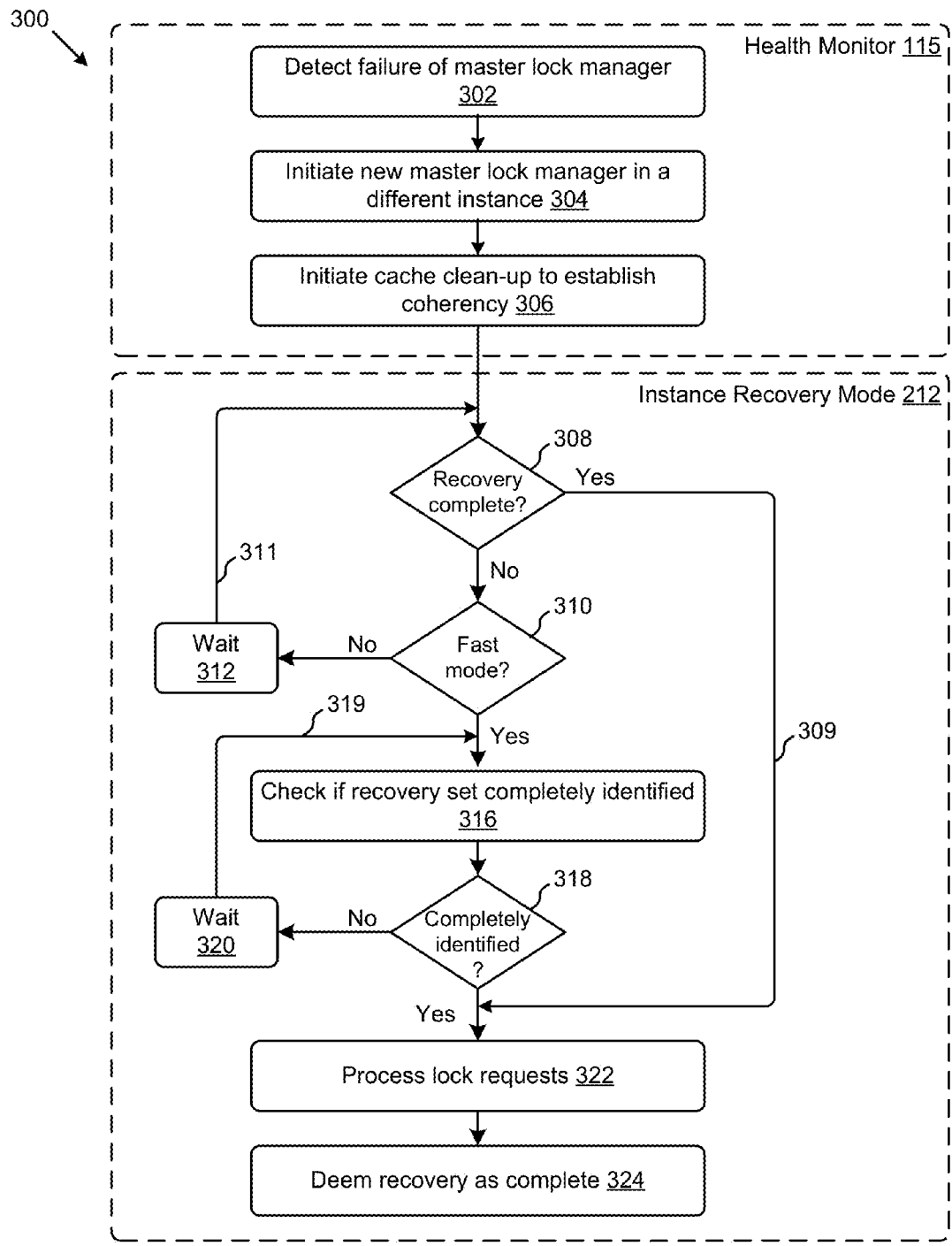
FIG. 3 shows a processing flow and decisions taken during a recovery mode as used for non-intrusive redeployment of a standby database facility in a cluster environment, according to some embodiments.

FIG. 3 shows a processing flow 300 and decisions taken during a recovery mode as used for non-intrusive redeployment of a standby database facility in a cluster environment. As an option, the present processing flow 300 may be implemented in the context of the architecture and functionality of the embodiments described herein. Also, the processing flow 300 or any aspect therein may be implemented in any desired environment.

In the embodiment shown, a health monitor 115 (or other process) can detect failure of a master lock manager (see operation 302), and forthwith initiates a new lock manager in a different instance (see operation 304). The embodiment shown describes detection of a failure of a master lock manager (see operation 302), however the underlying cause(s) for the detected failure can be from causes other than a processor crash or process crash. In fact, the lock process itself might not have failed, although if the ability of the lock manager to perform as intended is compromised, that functional failure can often be detected, and can result in the system taking steps to initiate a new master lock manager on a different instance than the instance deemed to have failed (see operation 304). The health monitor 115 might signal the cache service to clean-up the cache, for example to write 'dirty' blocks and flush the cache (see operation 306).

Processing within the aforementioned instance recovery mode 212 can proceed as shown in the depiction of instance recovery mode shown in processing flow 300. More specifically, instance recovery mode 212 traverses several loops in the implementation of instance recovery mode techniques, namely (1) blocking through rebuild completion and (2) blocking through recovery set identification.

Decision 308 seeks to determine if the recovery of the rebuilt standby is complete, and if so (see path 309) the recovery mode of the lock master can process lock requests normally (see operation 322), and then does deem the recovery standby as complete (see operation 324). This path can be taken regardless of the selected blocking technique.

In the case of blocking through rebuild completion, a loop incurs a wait (see operation 312) corresponding to each iteration through the loop including path 311. In some cases the possibly faster technique of blocking through recovery set identification is enabled (e.g., by a system administrator or by an agent or by a process) and if the faster mode is enabled (see fast mode decision 310) a loop is entered that tests if the recovery set is completely identified (see operation 316). In the case that the recovery set is not yet completely identified (see operation 318), then a wait (see operation 320) is executed, and the processing flow 300 loops (see path 319) until such time as the recovery set is completely identified, then the recovery mode of the lock master can process lock requests normally (see operation 322), and also deems the recovery as complete (see operation 324).

Figure 4A:
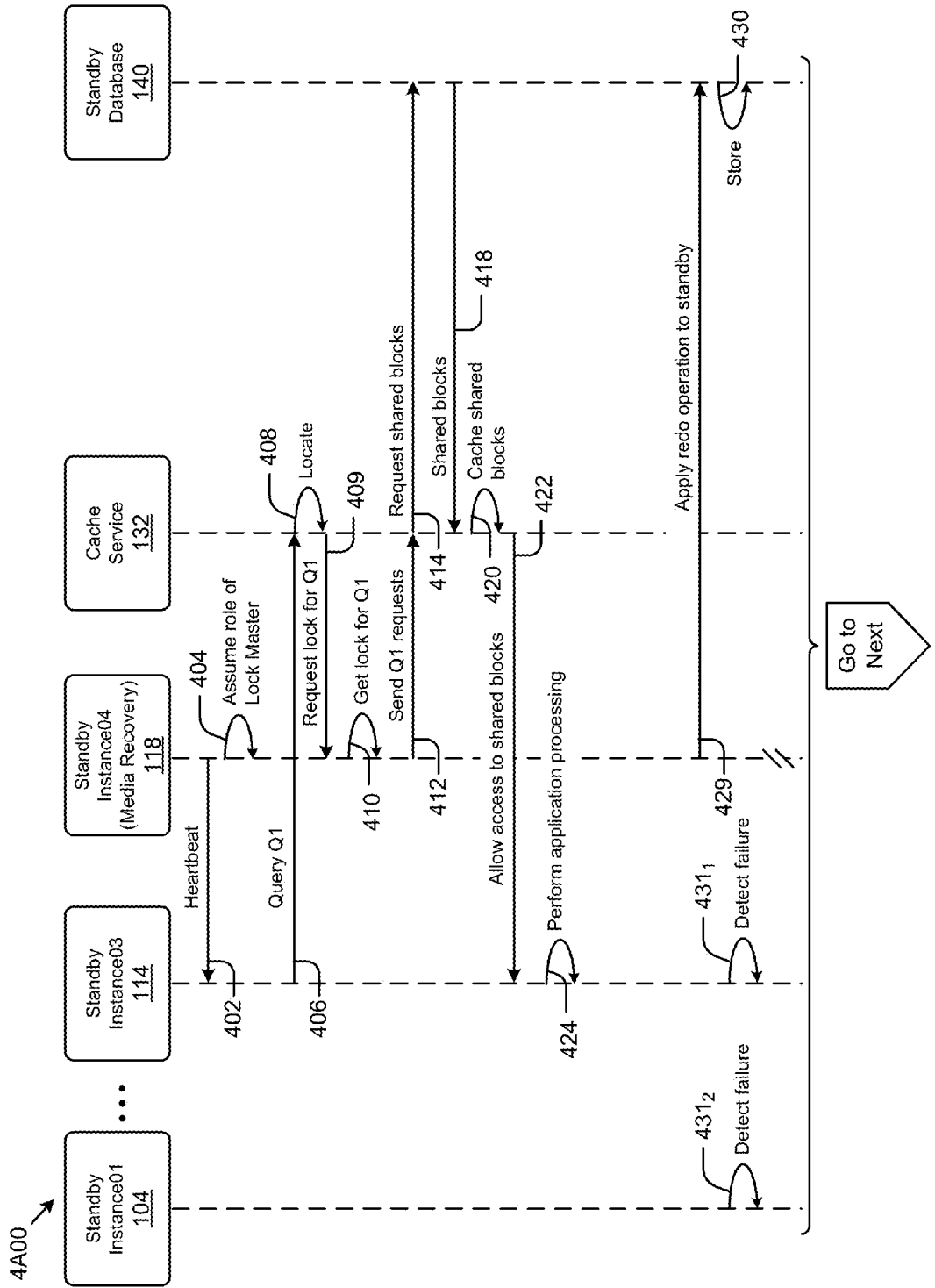
FIG. 4A is a message exchange between multiple instances as used in a system for non-intrusive redeployment of a standby database facility in a cluster environment, according to some embodiments.

FIG. 4A is a message exchange 4A00 between multiple instances as used in a system for non-intrusive redeployment of a standby database facility in a cluster environment. As an option, the present message exchange 4A00 may be implemented in the context of the architecture and functionality of the embodiments described herein. Also, the message exchange 4A00 or any aspect therein may be implemented in any desired environment.

The shown message exchange occurs during normal operation within a clustered standby database facility. Strictly as an illustrative example, a clustered standby database facility might be configured to comprise multiple instances (e.g., standby instance01 104, standby instance03 114, standby instance04 118, etc.); and at least one standby database 140. Various cluster services are provided (e.g., cache service 132). Standby instance04 118 serves as a standby media recovery instance (which instance runs a lock master instance). An exemplary message exchange and related operations for non-intrusive redeployment of a standby database facility in a cluster environment is now discussed with respect to FIG. 4A, FIG. 4B, and FIG. 4C.

The exchange of FIG. 4A commences when a standby instance initializes itself, and sends a heartbeat (see message 402) that is received by other instances. One of the standby instances assumes the role of a lock master (see operation 404), and at some point an instance will process a database operation (see message 406) and would access the cache service 132, which in turn would locate the block or blocks involved in the query (see operation 408) and would request a lock for the identified block or blocks (see message 409). The standby instance that hosts the lock master process would obtain a lock for the block or blocks corresponding to query Q1 (see operation 410), which would then place the query in a condition to be executed by the standby database (see message 412 and message 414). The standby database may return blocks (see operation 418) which in turn are cached by the cache service (see operation 420), and returned in a form corresponding to the query of the requesting instance (see message 422). Of course this is but one scenario, and those skilled in the art will recognize many possibilities for a query-cache-lock protocol.

At this point, the message exchange 4A00 depicts handling of an occurrence of a standby instance failure, which is detected by standby instance03 (see detection event $431_1$), and also detected by standby instance01 (see detection event $431_2$). During the processing of the protocol of FIG. 4A, a standby instance application (e.g., see operation 424) might perform standby database accesses, and might apply redo operations to the standby database (see message 429), and the processing of the protocol of FIG. 4A might include operations to actually store the objects of the redo operations in the standby database (see operation 430).

Figure 4B:
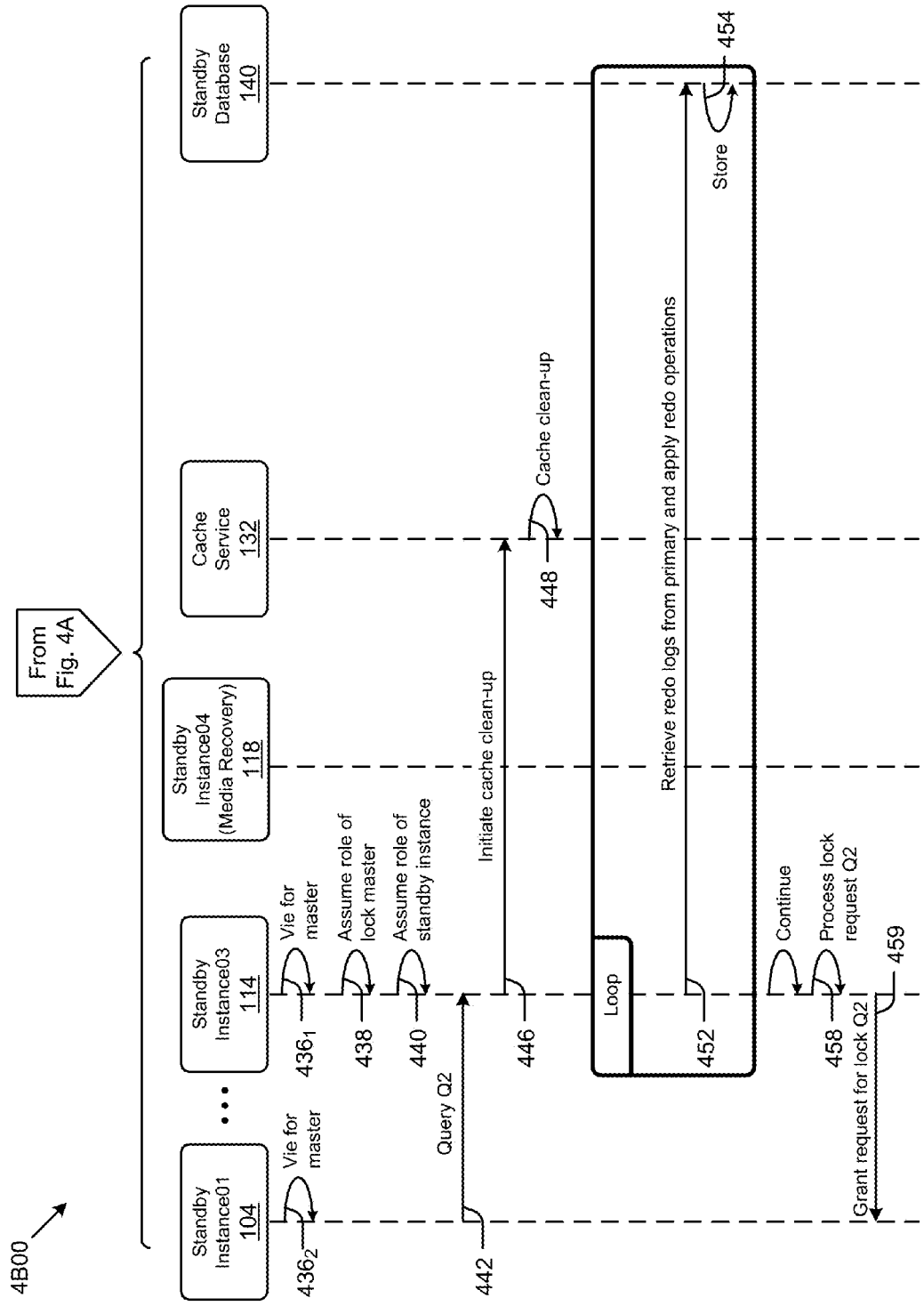
FIG. 4B is a message exchange for implementing a wait-for-rebuild regime as used in a system for non-intrusive redeployment of a standby database facility in a cluster environment, according to some embodiments.

FIG. 4B is a message exchange 4B00 for implementing a wait-for-rebuild regime as used in a system for non-intrusive redeployment of a standby database facility in a cluster environment. As an option, the present message exchange 4B00 may be implemented in the context of the architecture and functionality of the embodiments described herein. Also, the message exchange 4B00 or any aspect therein may be implemented in any desired environment.

As shown, after the detection events by standby instance01 and standby instance03, and as given in the foregoing (see detection event $431_2$ and detection event $431_1$ of FIG. 4A), standby instance01 and standby instance03 would vie for mastership (see operation $436_2$ and operation $436_1$). Only one would become the lock master, in this case standby instance03, and the winning instance would then assume the role of lock master (see operation 438), and also it could (as shown) assume the role of the standby instance recovery instance (see operation 440), and so identifies itself to all instances, possibly using the instance interconnect 161 of FIG. 1. Accordingly, an instance with a query to execute would issue the query (see message 442). In the scenario being described here in FIG. 4B, the system implements the technique of blocking through rebuild completion, accordingly the standby instance03, having assumed the role of the new lock master, starts the instance recovery, and waits for the recovery remedy to complete, and during the waiting, does not grant locks; a request for a lock such as from query Q2 (see message 442) will block (e.g., delay completion of lock requests) while the new standby instance (standby instance03, as shown) performs steps to assume the role of the new standby instance. Strictly as examples, the new standby instance (standby instance03) can initiate a request for the cache service to purge and clean-up (see message 446 and message 448). The new standby instance can iterate (see loop) through retrieving and applying redo operations (see message 452) to the standby database for storage (see operation 454) until the standby database is rebuilt. The standby instance03, having facilitated the standby database to be rebuilt, can now process requests for locks (see operation 458), and in particular, can grant any pending lock requests (see operation 459).

Figure 4C:
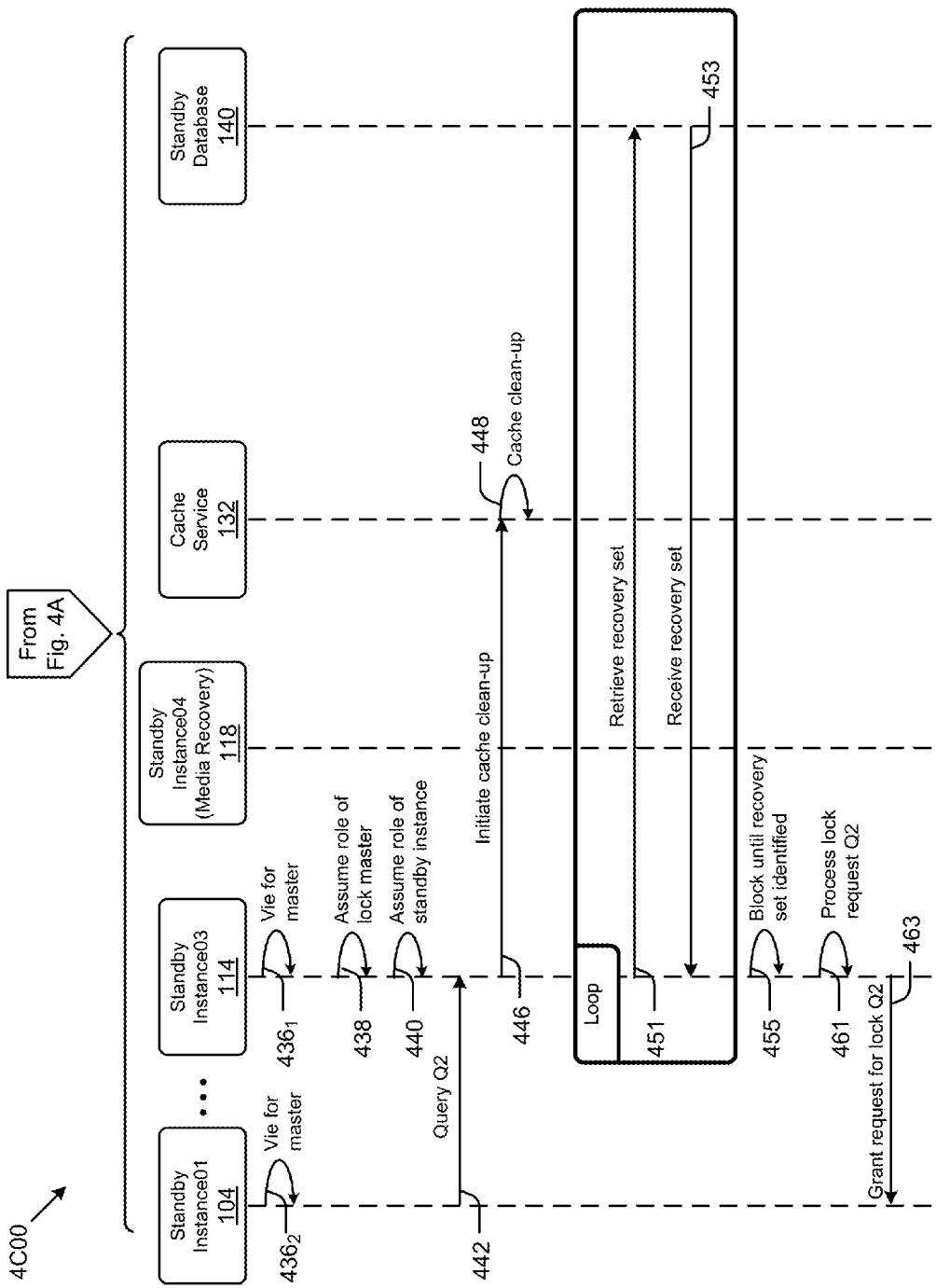
FIG. 4C is a message exchange for implementing a wait-for-recovery-set regime as used in a system for non-intrusive redeployment of a standby database facility in a cluster environment, according to some embodiments.

FIG. 4C is a message exchange 4C00 for implementing a wait-for-recovery-set regime as used in a system for non-intrusive redeployment of a standby database facility in a cluster environment. As an option, the present message exchange 4C00 may be implemented in the context of the architecture and functionality of the embodiments described herein. Also, the message exchange 4C00 or any aspect therein may be implemented in any desired environment.

As shown, after the detection events by standby instance01 and standby instance03, and as given in the foregoing (see detection event $431_1$ and detection event $431_2$ of FIG. 4A), standby instance03 and standby instance01 would vie for mastership (see operation $436_1$ and operation $436_2$). Only one would become the lock master, in this case standby instance03, and the winning instance would then assume the role of lock master (see operation 438). In the scenario being described here in FIG. 2B, the system implements the technique of blocking through recovery set identification, accordingly the standby instance03 enters a loop to wait on recovery set identification (see message 451, and message 453), and during this time standby instances are blocked until the new lock master process deems that the recovery set identification is complete (see operation 455), at which point the requested lock can be processed (see operation 461) and the request for lock Q2 can be granted (see operation 463).

Additional Embodiments of the Disclosure

Figure 5:
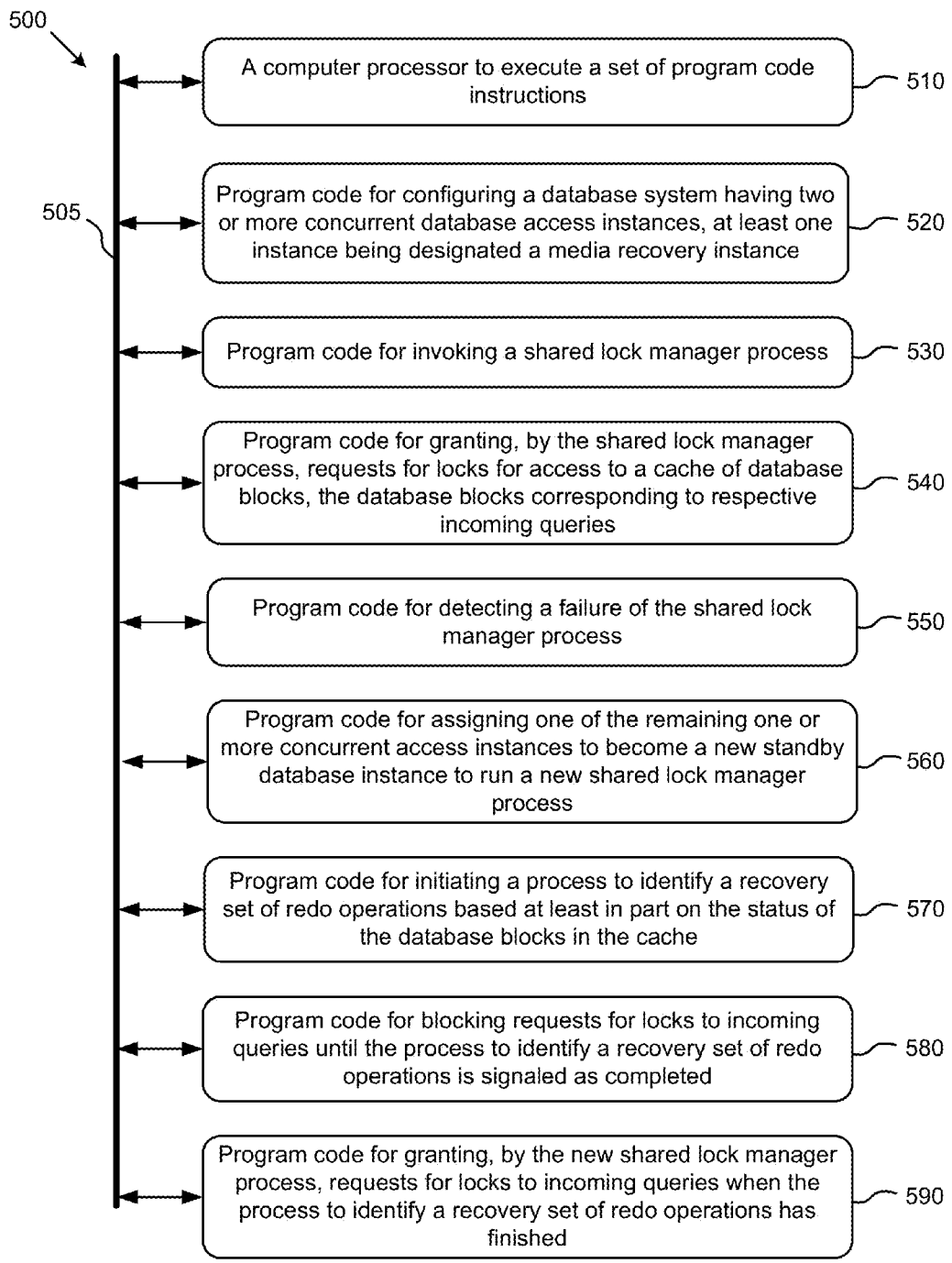
FIG. 5 is a system for non-intrusive redeployment of a standby database facility in a cluster environment, according to some embodiments.

FIG. 5 is a system for non-intrusive redeployment of a standby database facility in a cluster environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: configuring a database system having two or more concurrent database access instances, at least one instance being designated a media recovery instance (see module 520); invoking a shared lock manager process (see module 530); granting, by the shared lock manager process, requests for locks for access to a cache of database blocks, the database blocks corresponding to respective incoming queries (see module 540); detecting a failure of the shared lock manager process (see module 550); assigning one of the remaining one or more concurrent access instances to become a new standby database instance to run a new shared lock manager process (see module 560); initiating a process to identify a recovery set of redo operations based at least in part on the status of the database blocks in the cache (see module 570); blocking requests for locks to incoming queries until the process to identify a recovery set of redo operations is signaled as completed (see module 580); and granting, by the new shared lock manager process, requests for locks to incoming queries when the process to identify a recovery set of redo operations has finished (see module 590).

Figure 6:
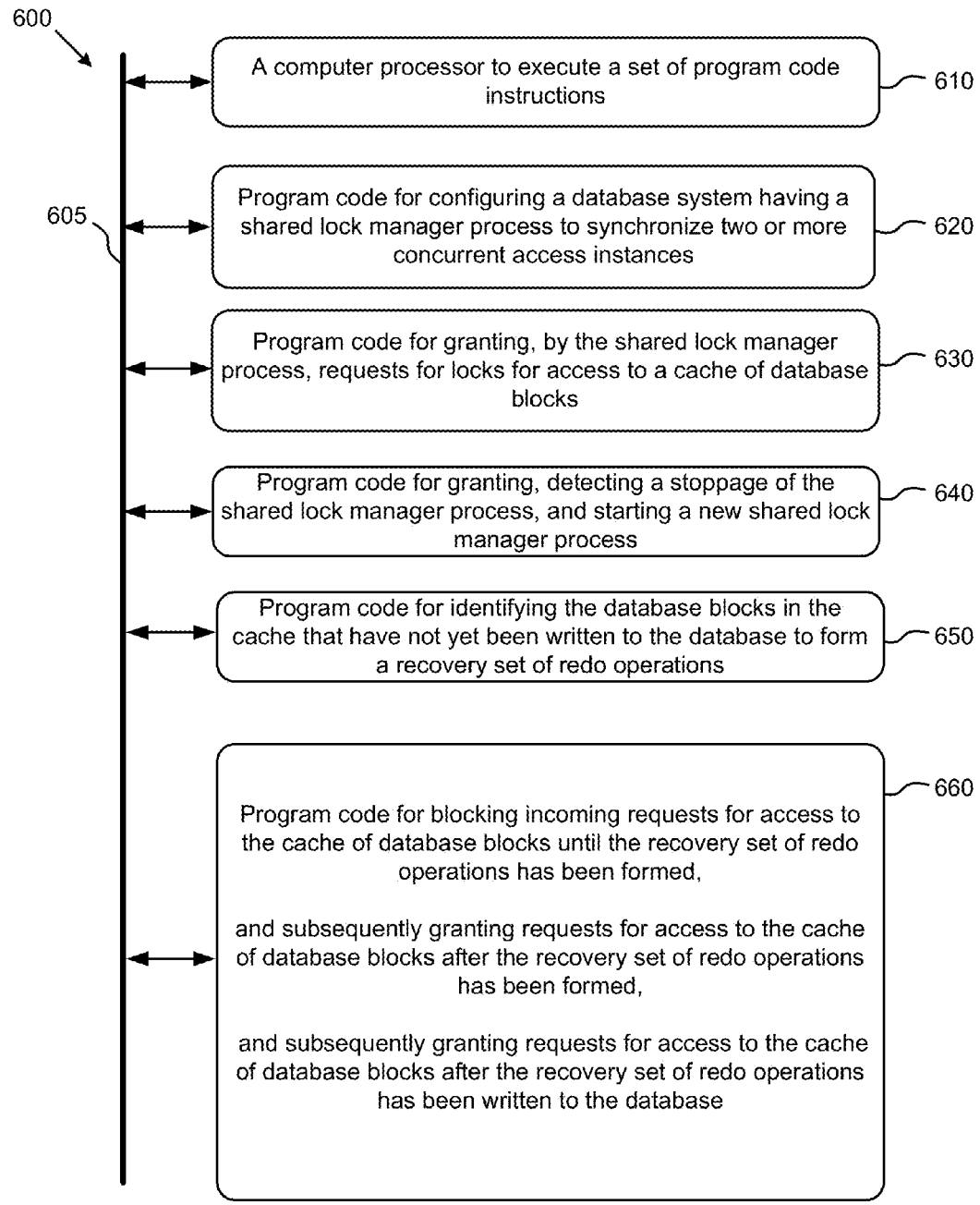
FIG. 6 is a system for non-intrusive redeployment of a standby database facility in a cluster environment, according to some embodiments.

FIG. 6 is a system for non-intrusive redeployment of a standby database facility in a cluster environment. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: configuring a database system having a shared lock manager process to synchronize two or more concurrent access instances (see module 620); granting, by the shared lock manager process, requests for locks for access to a cache of database blocks (see module 630); detecting a stoppage of the shared lock manager process, and starting a new shared lock manager process (see module 640); identifying the database blocks in the cache that have not yet been written to the database to form a recovery set of redo operations (see module 650); and blocking incoming requests for access to the cache of database blocks until the recovery set of redo operations has been formed (see module 660).

System Architecture Overview

Figure 7:
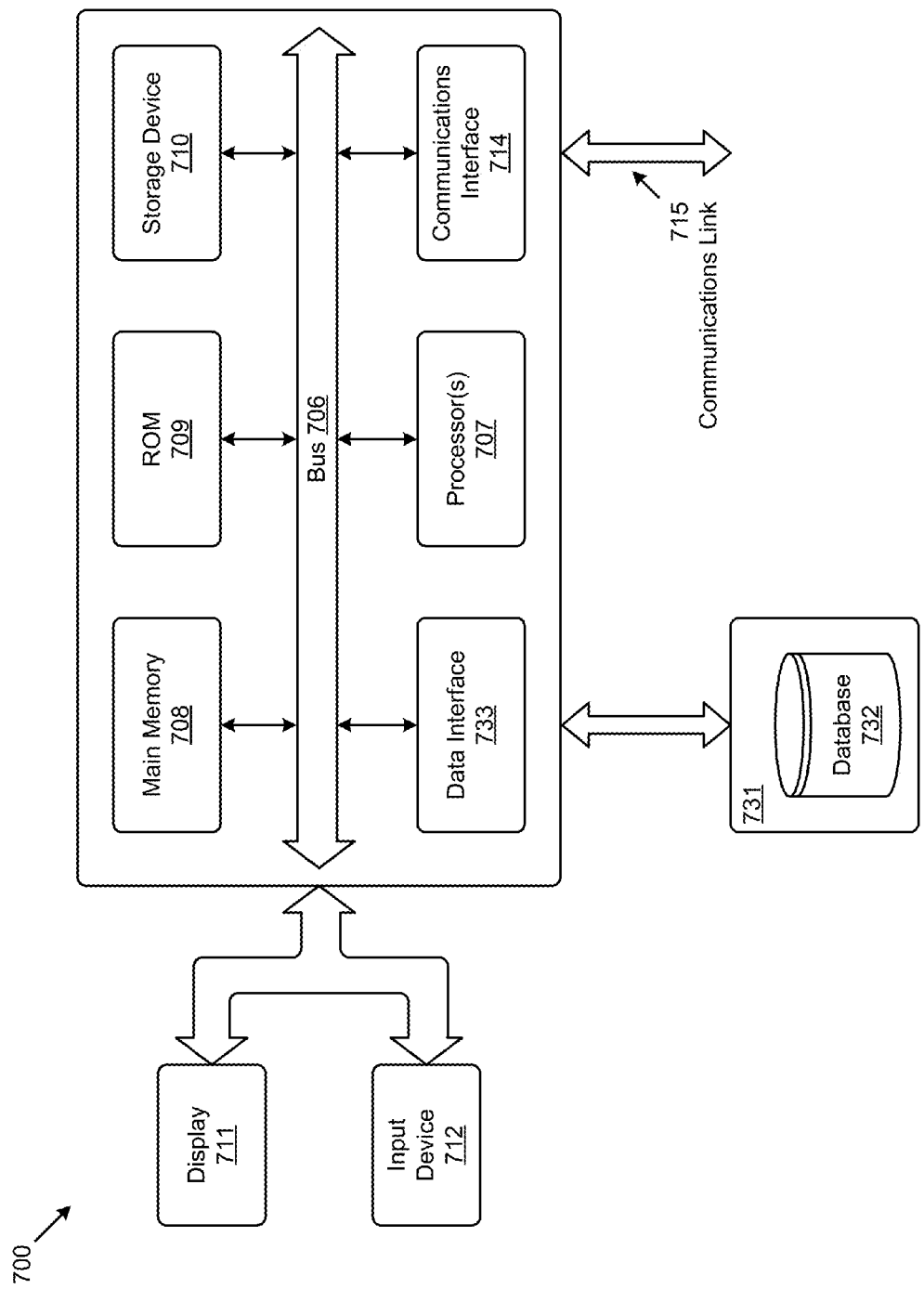
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for non-intrusive redeployment of a standby database facility, the method comprising:
   identifying a standby database that is maintained in synchronization with a primary database;
   configuring the standby database having a shared lock manager process to synchronize concurrent access to the standby database by two or more standby instances;
   granting, by the shared lock manager process, requests for locks for access to a cache of database blocks, wherein the cache is a cache service to provide cache access to the two or more standby instances;
   detecting a stoppage of the shared lock manager process, and starting a new shared lock manager process;
   identifying, in response to starting the new shared lock manager process, the database blocks in the cache that have not yet been written to the standby database, wherein the database blocks in the cache not yet written to the standby database correspond to changes to the primary database;
   forming a recovery set of redo operations based at least in part on a status of the identified database blocks in the cache, wherein the redo operations are changes from the primary database transmitted to a standby instance to be applied to the standby database; and
   blocking incoming requests for access to the cache of database blocks until the recovery set of redo operations has been formed.

2. The method of claim 1, further comprising granting requests for access to the cache of database blocks after the recovery set of redo operations has been formed.

3. The method of claim 1, further comprising granting requests for access to the cache of database blocks after the recovery set of redo operations has been written to the standby database.

4. The method of claim 1, wherein detecting the stoppage of the shared lock manager process detects a node stoppage.

5. The method of claim 1, wherein the cache service comprises a block status to indicate whether a particular database block in the cache has been written to the standby database.

6. The method of claim 1, further comprising applying the recovery set of redo operations using a new standby database instance.

7. The method of claim 1, further comprising entering an instance recovery mode after detecting the stoppage of the shared lock manager process.

8. A computer system for non-intrusive redeployment of a standby database facility, comprising:
   a computer processor to execute a set of program code instructions; and
   a memory to hold the program code instructions, in which the program code instructions comprises program code to perform,
   identifying a standby database that is maintained in synchronization with a primary database;
   configuring the standby database having a shared lock manager process to synchronize concurrent access to the standby database by two or more standby instances;
   granting, by the shared lock manager process, requests for locks for access to a cache of database blocks, wherein the cache is a cache service to provide cache access to the two or more standby instances;
   detecting a stoppage of the shared lock manager process, and starting a new shared lock manager process;
   identifying, in response to starting the new shared lock manager process, the database blocks in the cache that have not yet been written to the standby database, wherein the database blocks in the cache not yet written to the standby database correspond to changes to the primary database;
   forming a recovery set of redo operations based at least in part on a status of the identified database blocks in the cache, wherein the redo operations are changes from the primary database transmitted to a standby instance to be applied to the standby database; and
   blocking incoming requests for access to the cache of database blocks until the recovery set of redo operations has been formed.

9. The computer system of claim 8, further comprising program code for granting requests for access to the cache of database blocks after the recovery set of redo operations has been formed.

10. The computer system of claim 8, further comprising program code for granting requests for access to the cache of database blocks after the recovery set of redo operations has been written to the standby database.

11. The computer system of claim 8, wherein detecting the stoppage of the shared lock manager process detects a node stoppage.

12. The computer system of claim 8, wherein the cache service comprises a block status to indicate whether a particular database block in the cache has been written to the standby database.

13. The computer system of claim 8, further comprising program code for applying the recovery set of redo operations using a new standby database instance.

14. The computer system of claim 8, further comprising program code for entering an instance recovery mode after detecting the stoppage of the shared lock manager process.

15. A computer program product embodied in a non-transitory computer readable medium, the computer readable medium having stored thereon a sequence of instructions which, when executed by a processor causes the processor to execute a process to implement non-intrusive redeployment of a standby database facility, the process comprising:
- identifying a standby database that is maintained in synchronization with a primary database;
- configuring the standby database having a shared lock manager process to synchronize concurrent access to the standby database by two or more standby instances;
- granting, by the shared lock manager process, requests for locks for access to a cache of database blocks, wherein the cache is a cache service to provide cache access to the two or more standby instances;
- detecting a stoppage of the shared lock manager process, and starting a new shared lock manager process;
- identifying, in response to starting the new shared lock manager process, the database blocks in the cache that have not yet been written to the standby database, wherein the database blocks in the cache not yet written to the standby database correspond to changes to the primary database;
- forming a recovery set of redo operations based at least in part on a status of the identified database blocks in the cache, wherein the redo operations are changes from the primary database transmitted to a standby instance to be applied to the standby database; and
- blocking incoming requests for access to the cache of database blocks until the recovery set of redo operations has been formed.

16. The computer program product of claim 15, further comprising instructions for granting requests for access to the cache of database blocks after the recovery set of redo operations has been formed.

17. The computer program product of claim 15, further comprising instructions for granting requests for access to the cache of database blocks after the recovery set of redo operations has been written to the standby database.

18. The computer program product of claim 15, wherein detecting the stoppage of the shared lock manager process detects a node stoppage.

19. The computer program product of claim 15, wherein the cache service comprises a block status to indicate whether a particular database block in the cache has been written to the standby database.

20. The computer program product of claim 15, further comprising instructions for applying the recovery set of redo operations using a new standby database instance.

\* \* \* \* \*

UNITED STATES PATENT AND TRADEMARK OFFICE
CERTIFICATE OF CORRECTION

PATENT NO. : 9,514,160 B2
APPLICATION NO. : 13/794112
DATED : December 6, 2016
INVENTOR(S) : Song et al.

Page 1 of 1

It is certified that error appears in the above-identified patent and that said Letters Patent is hereby corrected as shown below:

On the Title Page

Column 2, under Other Publications, Line 1, delete "l0g" and insert -- 10g --, therefor.

On page 2, Column 2, under Other Publications, Line 1, delete "l0g" and insert -- 10g --, therefor.

In the Specification

In Column 3, Line 51, after "infra)" insert -- . --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*